United States Patent
Ho (10) Patent No.: US 9,652,111 B2
(45) Date of Patent: May 16, 2017

(54) METHOD AND SYSTEM FOR QUICKLY ARRANGING MULTIPLE WINDOWS AND MOBILE APPARATUS THEREOF

(71) Applicant: Wistron Corporation, New Taipei (TW)

(72) Inventor: Kuan-Ying Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 396 days.

(21) Appl. No.: 14/485,810

(22) Filed: Sep. 15, 2014

(65) Prior Publication Data

US 2015/0234579 A1    Aug. 20, 2015

(30) Foreign Application Priority Data

Feb. 14, 2014    (TW) .............................. 103104918 A (51) Int. Cl.
G06F 3/14 (2006.01)
G06F 3/0481 (2013.01)
G06F 3/0489 (2013.01)
G06F 3/0488 (2013.01)

(52) U.S. Cl.
CPC .......... *G06F 3/0481* (2013.01); *G06F 3/0489* (2013.01); *G06F 3/04886* (2013.01); *G06F 2203/04803* (2013.01)

(58) Field of Classification Search
CPC ..................................... G06F 3/14; G06F 3/17
USPC ............... 715/766, 798, 800, 716, 769, 792; 345/173
See application file for complete search history.

(56) References Cited

U.S. PATENT DOCUMENTS

| | | | |
|---|---|---|---|
| 2004/0261038 A1* | 12/2004 | Ording | G06F 3/0481 715/792 |
| 2010/0088634 A1* | 4/2010 | Tsuruta | G06F 3/0488 715/800 |
| 2010/0220978 A1* | 9/2010 | Ogikubo | G06F 3/04815 715/716 |

(Continued)

FOREIGN PATENT DOCUMENTS

| | | |
|---|---|---|
| CN | 103116438 | 5/2013 |
| CN | 103377235 | 10/2013 |
| EP | 1615118 | 1/2006 |

*Primary Examiner* — Ruay Ho
(74) *Attorney, Agent, or Firm* — Jianq Chyun IP Office (57) ABSTRACT

A method and a system for quickly arranging multiple windows for a mobile apparatus are provided. The method includes monitoring a window arrangement driving event at an application layer and when the window arrangement driving event is generated, transferring the window arrangement driving event from the application layer to a frameworks layer. The method also includes identifying a current arrangement mode and selecting a new arrangement mode according to the current arrangement mode; obtaining the window objects currently operated on the mobile apparatus; calculating a display position and a display size for each of the obtained window objects according to the new arrangement mode; and displaying the window objects on the touch screen of mobile apparatus according to the calculated display position and display size. Accordingly, the window objects can be quickly arranged by the method to effectively enhance the efficiency of multi-operation on the mobile apparatus.

12 Claims, 7 Drawing Sheets

(56) References Cited

U.S. PATENT DOCUMENTS

| | | | |
|---|---|---|---|
| 2013/0300684 A1* | 11/2013 | Kim | G06F 3/0488 345/173 |
| 2014/0337794 A1* | 11/2014 | Vranjes | G06F 9/4443 715/800 |
| 2014/0351748 A1* | 11/2014 | Xia | G06F 3/0481 715/798 |
| 2014/0365933 A1* | 12/2014 | Wu | G06F 3/04817 715/769 |
| 2015/0120817 A1* | 4/2015 | Jeong | G06F 3/1454 709/203 |

* cited by examiner

METHOD AND SYSTEM FOR QUICKLY ARRANGING MULTIPLE WINDOWS AND MOBILE APPARATUS THEREOF

CROSS-REFERENCE TO RELATED APPLICATION

This application claims the priority benefit of Taiwan application serial no. 103104918, filed on Feb. 14, 2014. The entirety of the above-mentioned patent application is hereby incorporated by reference herein and made a part of this specification.

FIELD OF THE INVENTION

The present invention is directed to a method and a system for quickly arranging multiple windows and more particularly, to a method and a system for quickly arranging multiple windows for a mobile apparatus having a touch screen.

DESCRIPTION OF RELATED ART

In recent years, mobile apparatuses, such as smart phones or tablet computers have gradually become indispensable in people's daily lives. With the trend of the market, screens of the mobile apparatuses are designed in larger and larger sizes while spaces designed for software interfaces are also increased. The progress in software and hardware technologies leads platforms of the mobile apparatuses to a multi-tasking capability. Therefore, the multi-window operation system for the mobile apparatuses that breaks through single-window manner has become a newly risen solution.

In the multi-window operation system, different applications are allowed to be operated by a plurality of window objects respectively. A user commonly needs to switch his/her focus to a certain window to operate the window, while the other windows remain running in background. In a conventional operation system, the user may perform operations, such as selecting the focus window, switching the window objects and adjusting maximization/minimization of the windows by using a mouse or a keyboard. However, on a mobile apparatus with a touch screen, these operations are hard to be performed through operations by fingers. Accordingly, how to provide the user with an intuitive operation for managing the window objects to enhance efficiency and smoothness of multi-operation on the mobile apparatus has become a major subject in the current mobile apparatus industry.

SUMMARY

The invention provides a method and a system for quickly arranging multiple windows and a mobile apparatus thereof, which are capable of quickly switching among window arrangement modes on a touch screen of the mobile apparatus, and thereby, an optimal window arrangement can be achieved, and multi-operation can be smoother on the mobile apparatus.

According to an exemplary embodiment, a method for quickly arranging multiple windows is provided. The method includes monitoring a window arrangement driving event at an application layer, and when the window arrangement driving event is generated, transferring the window arrangement driving event from the application layer to a frameworks layer. The method also includes identifying a current arrangement mode when the window arrangement driving event is received at the frameworks layer, and selecting a new arrangement mode according to the current arrangement mode. The method further includes obtaining the window objects currently operated on the mobile apparatus; calculating a display position and a display size for each of the window objects according to the new arrangement mode; and displaying each of the window objects on the touch screen of mobile apparatus according to the display position and the display size.

In an embodiment of the invention, the step of displaying each of the window objects on the touch screen of the mobile apparatus according to the display position and the size includes sequentially displaying the window objects on a foreground of the touch screen according to a sequence and setting one of the window objects as an active window.

In an embodiment of the invention, the sequence is determined according to an execution sequence of each of the window objects, and the one of the window objects is the latest operated window object among the window objects.

In an embodiment of the invention, the window arrangement driving event is triggered by a key displayed on the touch screen.

In an embodiment of the invention, the window management mode includes a side-by-side mode, a 4-grid mode and a cascade mode, and the step of identifying the current arrangement mode and selecting the new arrangement mode according to the current arrangement mode includes checking the current window arrangement mode; if the current window arrangement mode is the side-by-side mode, setting the new arrangement mode as the 4-grid arrangement; if the current window arrangement mode is the 4-grid arrangement mode, setting the new arrangement mode as the cascade mode; and if the current window arrangement mode is the cascade arrangement mode, setting the new arrangement mode as the side-by-side mode.

According to an exemplary embodiment, a system for quickly arranging multiple windows for a mobile apparatus having a touch screen is provided. The system for quickly arranging multiple windows includes a rearrangement event monitoring module and a window management module. The rearrangement event monitoring module is configured to monitor a window arrangement driving event at an application layer, and the window management module is coupled to rearrangement event monitoring module and configured to manage a plurality multi-window objects operated by the mobile apparatus. When the window arrangement driving event is generated, the rearrangement event monitoring module is further configured to transfer the window arrangement driving event from the application layer to a frameworks layer. The window management module further includes a multi-window mode controller module, and the multi-window mode controller module is further configured to identify a current arrangement mode and select a new arrangement mode according to the current arrangement mode when the window arrangement driving event is received at the frameworks layer. The multi-window mode controller module is further configured to obtain window objects currently operated on the mobile apparatus and calculate a display position and a display size for each of the window objects according to the new arrangement mode. The window management module is further configured to display each of the window objects on the touch screen of mobile apparatus according to the display position and the display size.

In an embodiment of the invention, the system further includes an activity management module. The activity management module is configured to sequentially display the window objects on a foreground of the touch screen according to a sequence and set one of the window objects as an active window.

In an embodiment of the invention, the sequence is determined according to an execution sequence of each of the window objects, and the one of the window objects is the latest operated window object among the window objects.

In an embodiment of the invention, the window arrangement driving event is triggered by a key display one the touch screen.

In an embodiment of the invention, the window arrangement modes include a side-by-side mode, a 4-grid mode and a cascade mode. The multi-window mode controller module is further configured to check the current window arrangement mode. If the current window arrangement mode is the side-by-side mode, the multi-window mode controller module sets the new arrangement mode to be the 4-grid mode. If the current window arrangement mode is the 4-grid mode, the multi-window mode controller module sets the new arrangement mode to be the cascade mode. If the current window arrangement mode is the cascade mode, the multi-window mode controller module sets the new arrangement mode to be the side-by-side mode.

According to an exemplary embodiment, a mobile apparatus, which includes a touch screen, a memory circuit, a microprocessor and a quick multi-window arrangement system, is provided. The memory circuit is configured to store a plurality of commands. The microprocessor is coupled to the touch screen and the memory circuit to execute the commands. The quick multi-window arrangement system is coupled to the microprocessor and configured to quickly arrange a plurality of window objects of the mobile apparatus. The quick multi-window arrangement system includes a rearrangement event monitoring module and a window management module. The rearrangement event monitoring module is configured to listen to a window arrangement driving event at an application layer. The window management module is coupled to the rearrangement event monitoring module and configured to manage a plurality of window objects operated by the mobile apparatus. The window management module further includes a multi-window mode controller module. When the window arrangement driving event is generated, the rearrangement event monitoring module is further configured to transfer the window arrangement driving event from the application layer to a frameworks layer. The multi-window mode controller module is further configured to identify a current arrangement mode and select a new arrangement mode according to the current arrangement mode when the window arrangement driving event is received at the frameworks layer. The multi-window mode controller module is further configured to obtain window objects currently operated on the mobile apparatus and calculate a display position and a display size for each of the window objects according to the new arrangement mode. The window management module further has a window setting module configured to display each of the window objects on the touch screen of the mobile apparatus according to the display position and the display size.

In an embodiment of the invention, the quick multi-window arrangement system further includes an activity management module. The activity management module is coupled to the window management module and has a foreground task setting module configured to sequentially display the window objects on a foreground of the touch screen according to a sequence and set one of the window objects as an active window.

In an embodiment of the invention, the sequence is determined according to an execution sequence of each of the window objects, and the one of the window objects is the latest operated window object among the window objects.

In an embodiment of the invention, the window arrangement driving event is triggered by a key displayed on the touch screen.

In an embodiment of the invention, the window arrangement modes include a side-by-side mode, a 4-grid mode and a cascade mode. The multi-window mode controller module is further configured to check the current window arrangement mode. If the current window arrangement mode is the side-by-side mode, the multi-window mode controller module sets the new arrangement mode to be the 4-grid mode. If the current window arrangement mode is the 4-grid mode, the multi-window mode controller module sets the new arrangement mode to be the cascade mode. If the current window arrangement mode is the cascade mode, the multi-window mode controller module sets the new arrangement mode to be the side-by-side mode.

Based on the above, in the method and the system for quickly arranging multi-window and the mobile apparatus thereof, multiple different window objects can be quickly, sequentially and neatly arranged to an optimal state by a one-finger touch, such that a target window can be identified in a multi-window operation system more quickly, and efficiency and smoothness of multi-operation can be effectively enhanced.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to enhance operation efficiency in a multi-window operation system of a mobile apparatus, the invention provides a method and a system for quickly switching among window arrangement modes by touch control. Thereby, a user can identify a target window and transfer to a focus window more quickly. Therefore, efficiency of multi-operation on the mobile apparatus can be enhanced.

Figure 1:
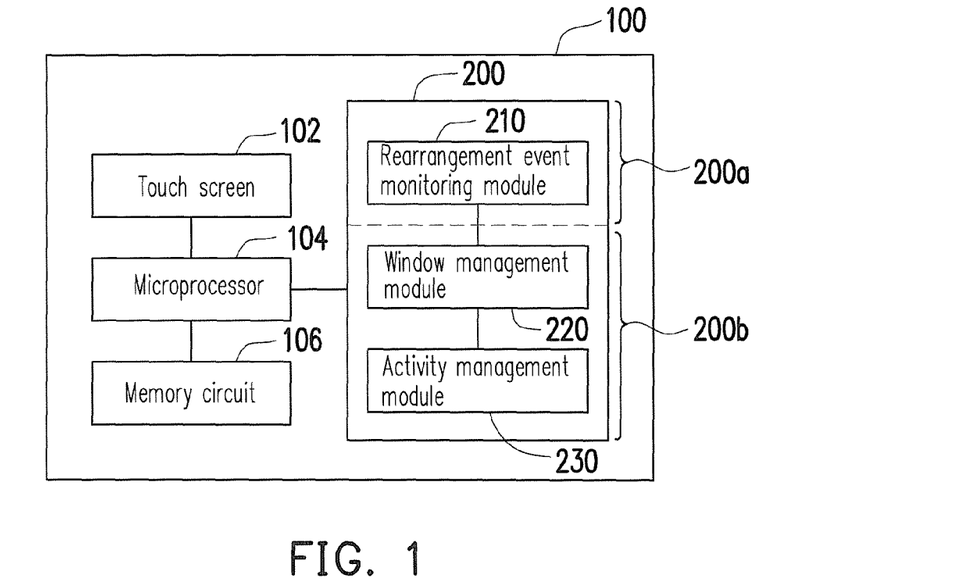
FIG. 1 is a schematic block diagram illustrating a mobile apparatus having a multi-window arrangement system according to an exemplary embodiment of the invention.

FIG. 1 is a schematic block diagram illustrating a mobile apparatus having a multi-window arrangement system according to an exemplary embodiment of the invention. It should be understood that the example of FIG. 1 is illustrated for descriptive convenience, but construes no limitations to the invention.

Referring to FIG. 1, a mobile apparatus 100 includes a touch screen 102, a microprocessor 104, a memory circuit 106 and a quick multi-window arrangement system 200.

The microprocessor is configured to control the overall operation of the mobile apparatus 100. For example, the microprocessor 104 is a central processing unit (CPU). Specially, the microprocessor 104 issues commands to the multi-window arrangement system 200 to quickly arrange a plurality of window objects operated by the mobile apparatus 100.

The memory circuit 106 is coupled to the microprocessor 104 and configured to store commands or data executed by the microprocessor 104. For example, in the present exemplary embodiment, the memory circuit 106 may be a dynamic random access memory (DRAM) or a static random access memory (SRAM), for example. Nevertheless, it should be understood that the present invention is not limited thereto, and the memory circuit 106 may also be any other suitable memory.

The quick multi-window arrangement system 200 includes a rearrangement event monitoring module 210, a window management module 220 and an activity management module 230. Specially, the quick multi-window arrangement system 200 can be divided into an application layer 200a and a frameworks layer 200b. The application layer 200a serves applications, such as E-mail client programs, SMS messaging programs, calendars, maps, browsers and contact management and so on. The frameworks layer 200b serves core applications, such as views, content providers, resource manager, notification manager, activity manager. For example, in an exemplary embodiment, the application layer 200a and the frameworks layer 200b is coded by JAVA.

In the present exemplary embodiment, the rearrangement event monitoring module 210 is configured at the application layer 200a, and the window management module 220 and the activity management module 230 are configured at the frameworks layer 200b.

Figure 2:
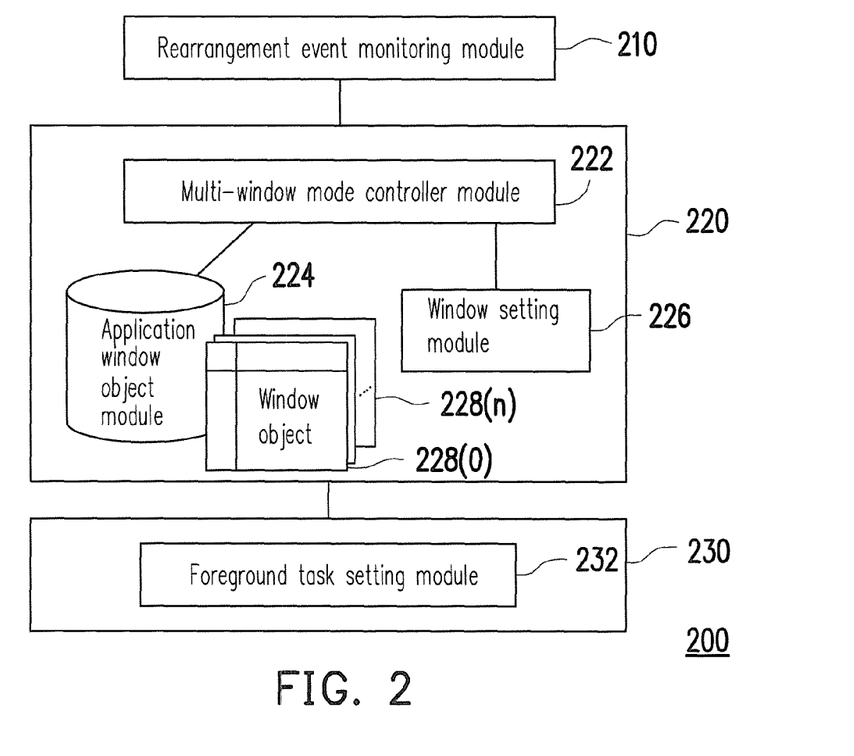
FIG. 2 is a schematic block diagram illustrating a multi-window arrangement system according to an exemplary embodiment of the invention.

FIG. 2 is a schematic block diagram illustrating a multi-window arrangement system according to an exemplary embodiment of the invention.

Referring to FIG. 2, the quick multi-window arrangement system 200 includes a rearrangement event monitoring module 210, a window management module 220 and an activity management module 230. It is to be mentioned that in the present exemplary embodiment, the rearrangement event monitoring module 210, the window management module 220 and the activity management module 230 are implemented in a software form. However, the invention is not limited thereto, and in another exemplary embodiment, the rearrangement event monitoring module 210, the window management module 220 and the activity management module 230 may be implemented in a hardware form.

The rearrangement event monitoring module 210 is configured to monitor a window arrangement driving event at the application layer 200a.

The window management module 220 is coupled to the rearrangement event monitoring module 210 and configured to manage a plurality of window objects operated by the mobile apparatus 100. The window management module 220 includes a multi-window mode controller module 222, an application window object module 224 and a window setting module 226. The application window object module 224 is configured to manage all window objects 228(0) to 228(n) operated by the mobile apparatus 100. The window setting module 226 is configured to arrange the window objects 228(0) to 228(n).

To be more specific, when monitoring a window arrangement driving event, the rearrangement event monitoring module 210 transfers the window arrangement driving event from the application layer 200a to the frameworks layer 200b. When the window arrangement driving event is received at the frameworks layer 200b, the multi-window mode controller module 222 is configured to identify a current arrangement mode of the window objects currently operated by the mobile apparatus 100 and select a new arrangement mode according to the current arrangement mode. Additionally, the multi-window mode controller module 222 obtains all the window objects 228(0) to 228(n) currently operated on the mobile apparatus 100 from the application window object module 224 and calculate a display position and a display size for each of the obtained window objects according to the new arrangement mode. Finally, the window setting module 226 displays each of the window objects according to the display position and the display size.

The activity management module 230 includes a foreground task setting module 232. The foreground task setting module 232 is configured to sequentially display the window objects 228(0) to 228(n) on a foreground according to a sequence and set one of the window objects 228(0) to 228(n) as an active window. Specifically, the sequence is determined according to an operation sequence of each of the window objects, and the one window object set as the active window is the latest operated window object.

Figure 3:
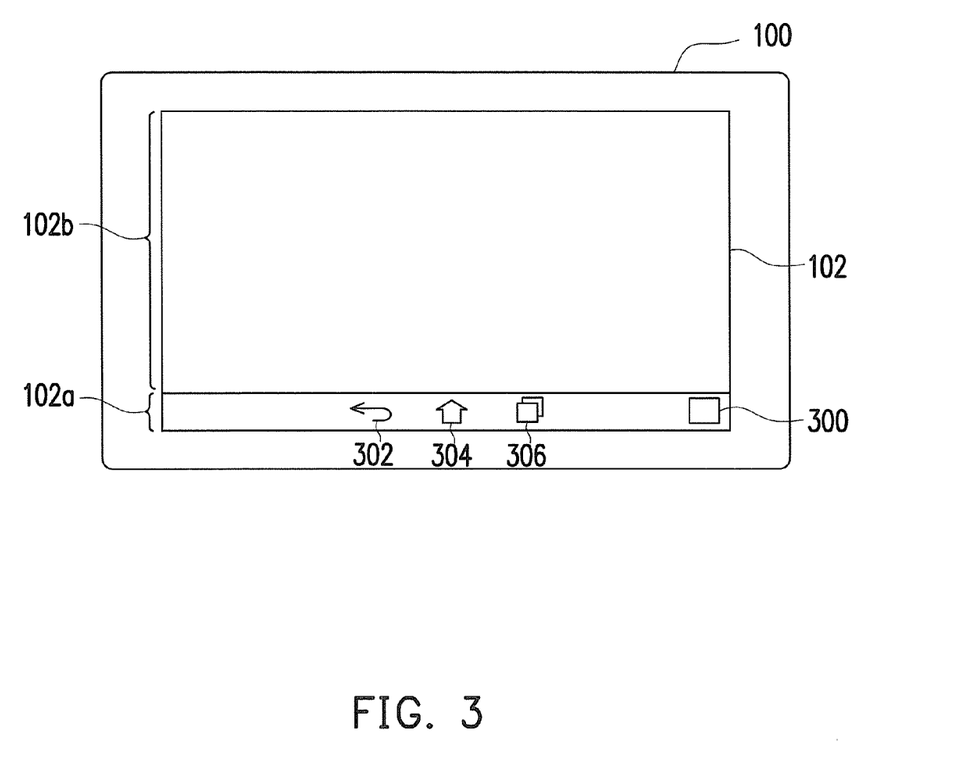
FIG. 3 is a schematic diagram of a mobile apparatus according to an exemplary embodiment of the invention.

FIG. 3 is a schematic diagram of a mobile apparatus according to an exemplary embodiment of the invention.

Referring to FIG. 3, FIG. 3 illustrates a schematic front view of the mobile apparatus 100 illustrated in FIG. 1. For example, the touch screen 102 includes a variable region 102a and a fixed region 102b. The fixed region 102b contains a key 300. The window arrangement driving event is triggered by the key 300 displayed on the touch screen 102. The variable region 102a is configured to display an arrangement result of the window objects.

It is to be mentioned that in order for the user to trigger the window arrangement driving event any time, the key 300 is deployed and resident on a specific position of the fixed region 102b on the touch screen 102, such that the user may locate the key 300 quickly to click to switch to a window arrangement mode. For example, the fixed region 102b contains a return key 302, a home key 304 and a multi-task key 306 on a default system bar, and thus, deploying the key 300 on the system bar in the fixed region 102b causes the least affection to the original system and user interface.

For example, the window arrangement modes include a side-by-side mode, a 4-grid mode and a cascade mode. Nevertheless, it should be understood that the invention is not limited thereto, and the window arrangement mode may also be any other suitable mode. In the present exemplary embodiment, the multi-window mode controller module 222 is configured to check the current window arrangement mode. If the current window arrangement mode is the side-by-side mode, the multi-window controller module 222 sets the new arrangement mode to be the 4-grid mode. If the current window arrangement mode is the 4-grid mode, the multi-window controller module 222 sets the new arrangement mode to be the cascade mode. If the current window arrangement mode is the cascade mode, the multi-window controller module 222 sets the new arrangement mode to be the side-by-side mode.

Figure 4A:
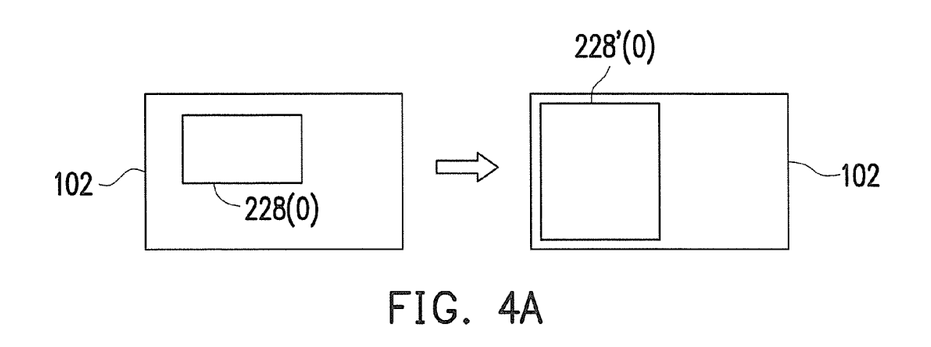
FIGS. 4A to 4C are schematic diagrams illustrating the automatic arrangement method performed of the side-by-side mode according to an exemplary embodiment of the invention.
Figure 4B:
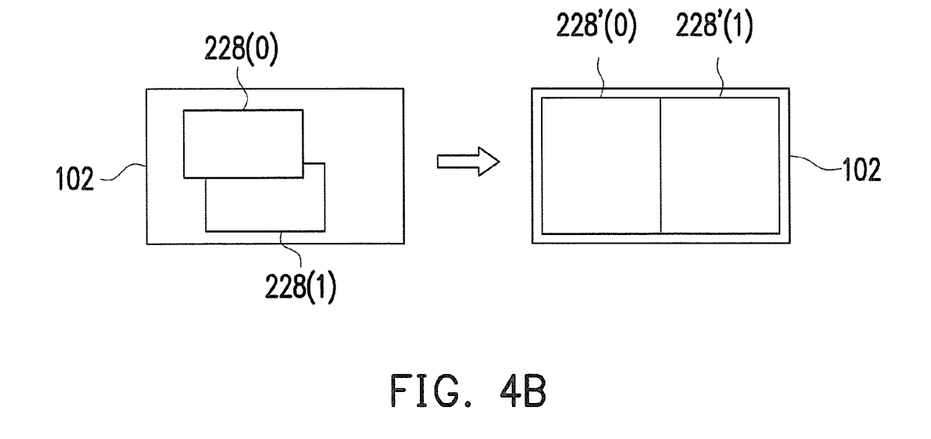
Figure 4C:
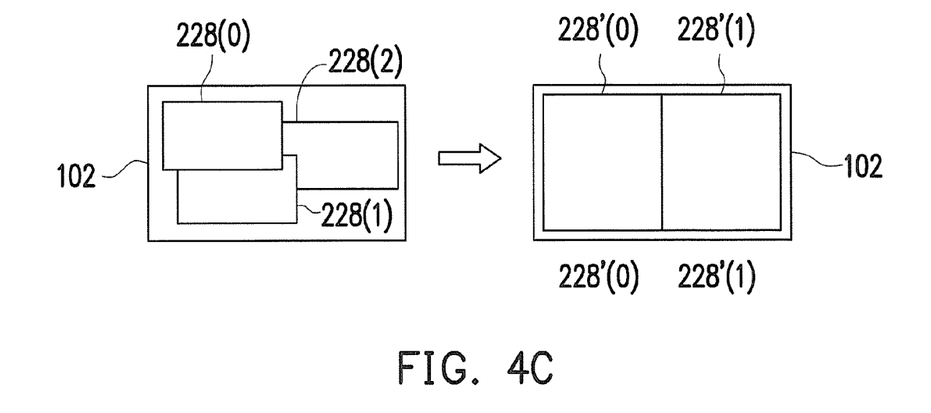
Figure 5A:
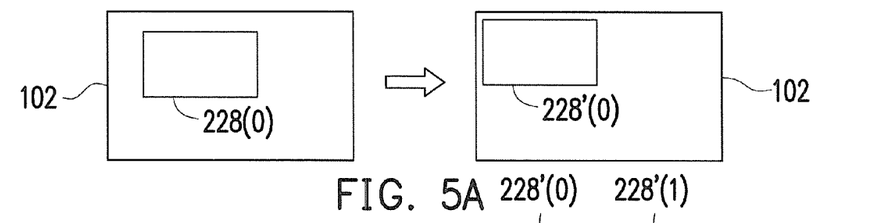
FIGS. 5A to 5E are schematic diagrams illustrating the automatic arrangement method performed of the 4-grid mode according to an exemplary embodiment of the invention.
Figure 5B:
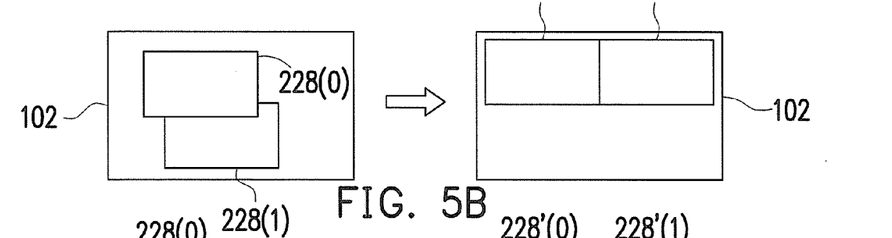
Figure 5C:
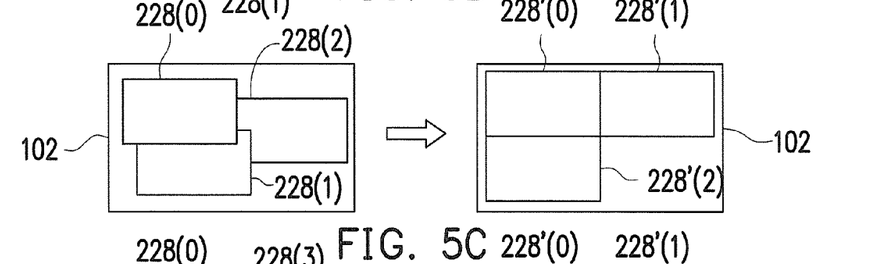
Figure 5D:
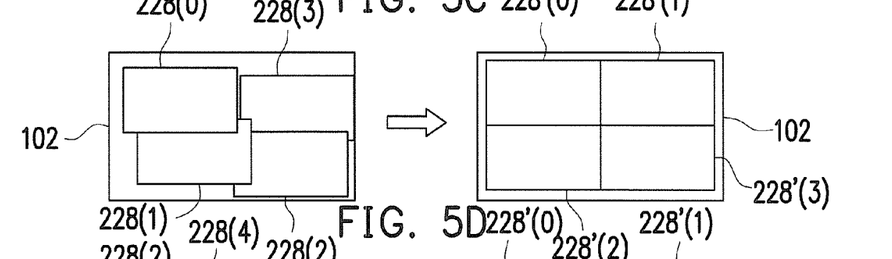
Figure 5E:
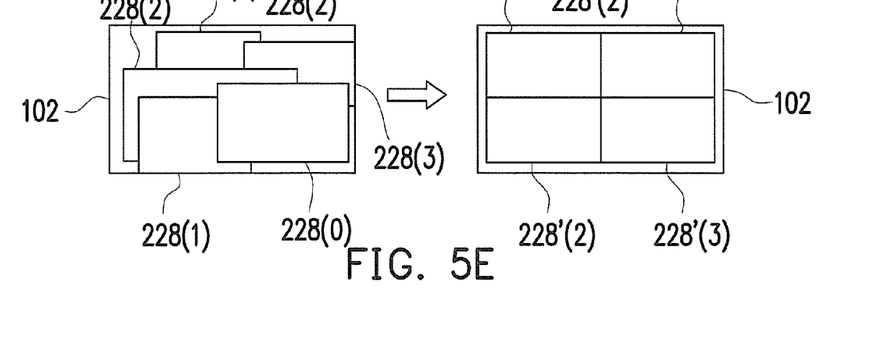

FIGS. 4A to 4C are schematic diagrams illustrating the automatic arrangement method performed of the side-by-side mode according to an exemplary embodiment of the invention.

FIGS. 4A to 4C illustrates a scenario where after the window arrangement driving event is received at the frameworks layer 200b, the multi-window mode controller module 222 identifies that the current arrangement mode of all the window objects currently operated by the mobile apparatus 100 is the cascade mode and selects the side-by-side mode as the new arrangement mode according to the current arrangement mode.

Referring to FIG. 4A, in a non-automatic arrangement state (as shown at the left side), the window object currently operated on the mobile apparatus 100 and obtained from the application window object module 224 by the multi-window mode controller module 222 is the window object 228(0), and the multi-window mode controller module 222 calculates a display position and a display size for the obtained window object 228(0) according to the new arrangement mode (i.e., the side-by-side mode). Then, the window setting module 226 arranges the window object 228(0) according to the calculated display position and display size. Since the number of the window objects obtained from the application window object module 224 is only one, the arranged window object 228(0) is located at the left of the touch screen 102 in a way that a window object 228'(0) is in an automatic arrangement state (as shown at the right side).

Referring to FIG. 4B, in the non-automatic arrangement state (as shown at the left side), the window objects currently operated on the mobile apparatus 100 and obtained from the application window object module 224 by the multi-window mode controller module 222 are the window objects 228(0) and 228(1), and the multi-window mode controller module 222 calculates display positions and display sizes for the obtained window objects 228(0) and 228(1) according to the new arrangement mode (i.e., the side-by-side mode). Then, the window setting module 226 arranges the window objects 228(0) and 228(1) according to the calculated display positions and display sizes. The arranged window objects 228(0) and 228(1) are arranged side by side on the touch screen 102 in a way that window objects 228'(0) and 228'(0) are in the automatic arrangement state (as shown at the right side).

Referring to FIG. 4C, in the non-automatic arrangement state (as shown at the left side), the window objects currently operated on the mobile apparatus 100 and obtained from the application window object module 224 by the multi-window mode controller module 222 are the window objects 228(0) to 228(2), and the multi-window mode controller module 222 calculates display positions and display sizes for the obtained window objects 228(0) to 228(2) according to the new arrangement mode (i.e., the side-by-side mode). Specially, since the number of window objects obtained from the application window object module 224 is 3. The foreground task setting module 232 sequentially display the window objects 228(0) to 228(2) on the foreground of the mobile apparatus 100 according to an execution sequence of the window objects 228(0) to 228(2) and only displays the two latest operated window objects according to the side-by-side mode. That is, as shown in the automatic arrangement state (as shown at the right side), the latest operated window objects 228'(0) and 228'(1) are separated and arranged side by side on the touch screen 102 in a way that window objects 228'(0) and 228'(0) are in the automatic arrangement state (as shown at the right side). In this case, the latest operated window object 228'(0) is set as an active window, but the invention is not limited thereto.

It is to be mentioned that in the side-by-side mode, the two window objects are symmetrically arranged on the left and the right on the screen by the multi-window arrangement system, and thus, the user may quickly operate two applications provided by the two window objects simultaneously, without additionally switching the windows. When the number of the window objects viewable on the screen is more than 2, two latest operated window objects used by the user is displayed on the touch screen by the multi-window arrangement system. Specially, with the side-by-side mode, the user may conveniently operate and view the two applications. For example, while starting a browser to surf shopping information on a website, the user may open a map application to search for a shop position or may receive email while looking up data.

FIGS. 5A to 5E are schematic diagrams illustrating the automatic arrangement method performed of the 4-grid mode according to an exemplary embodiment of the invention.

FIGS. 5A to 5E illustrates a scenario where after the window arrangement driving event is received at the frameworks layer 200b, the multi-window mode controller module 222 identifies that the current arrangement mode of all the window objects currently operated by the mobile apparatus 100 is the side-by-side mode. Thus, according to the current arrangement mode, the 4-grid mode is selected as the new arrangement mode. The automatic arrangement method of the 4-grid mode is similar to that of the side-by-side mode, and they are different from each other in that in the 4-grid mode, the arranged window objects are separated in four blocks, i.e., the upper left, the upper right, the lower left and the lower right, on the touch screen 102, and the four block do not overlap with one another. Therefore, the automatic arrangement method of the 4-grid mode is not repeatedly described hereinafter.

It is to be mentioned that in the 4-grid mode, the user may simultaneously operate applications provided by four window objects. The mode is applicable to a scenario where the user needs to simultaneously operate 3 to 4 applications, and a display size required by each of the applications is not large.

FIGS. 6A to 6D are schematic diagrams illustrating an automatic arrangement of the cascade mode according to an exemplary embodiment of the invention.

FIGS. 6A to 6D illustrates a scenario where after the window arrangement driving event is received at the frameworks layer 200b, the multi-window mode controller module 222 identifies that the current arrangement mode of all the window objects currently operated by the mobile apparatus 100 is the 4-grid mode. Thus, according to the current arrangement mode, the cascade mode is selected as the new arrangement mode.

Figure 6A:
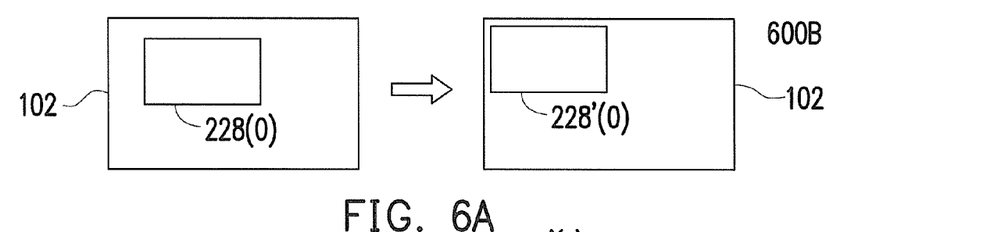
FIGS. 6A to 6D are schematic diagrams illustrating the automatic arrangement method performed of the cascade mode according to an exemplary embodiment of the invention.

Referring to FIG. 6A, in a non-automatic arrangement state (as shown at the left side), the window object currently operated on the mobile apparatus 100 and obtained from the application window object module 224 by the multi-window mode controller module 222 is the window object 228(0), and the multi-window mode controller module 222 calculates a display position and a display size for the obtained window object 228(0) according to the new arrangement mode (i.e., the cascade mode). Then, the window setting module 226 arranges the window object 228(0) according to the calculated display position and display size. Since the number of the window objects obtained from the application window object module 224 is only one, the arranged window object 228(0) is located in the center of the touch screen 102 in a way that a window object 228'(0) is in an automatically arranged state (as shown at the right side).

Figure 6B:
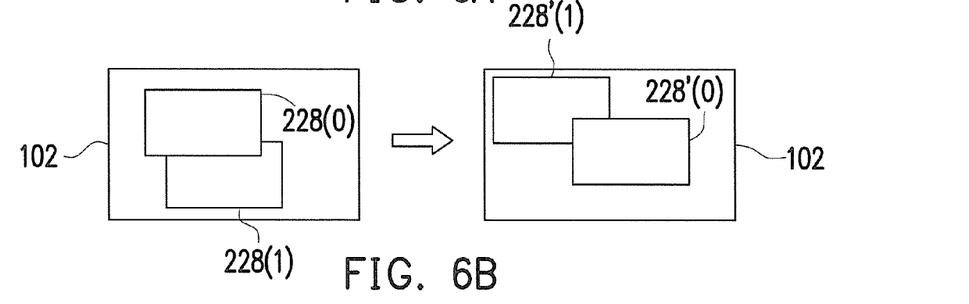

Referring to FIG. 6B, in the non-automatic arrangement state (as shown at the left side), the window objects currently operated on the mobile apparatus 100 and obtained from the application window object module 224 by the multi-window mode controller module 222 are the window objects 228(0) and 228(1), and the multi-window mode controller module 222 calculates display positions and display sizes for the obtained window objects 228(0) and 228(1) according to the new arrangement mode. Then, the window setting module 226 arranges the window objects 228(0) and 228(1) according to the calculated display positions and display sizes. Specially, in the cascade mode, the calculated display size of each of the window objects is set to be the same, and namely, the calculated display sizes of the window objects 228(0) and 228(1) are the same. Additionally, the foreground task setting module 232 sequentially displays the window objects 228(0) to 228(1) on the foreground of the mobile apparatus 100 according to an execution sequence of the window objects 228(0) to 228(1) and displays by stacking the window object 228(0) on the window object 228(1) from the lower right to the upper left on the screen of the touch screen 102 according to the execution sequence. That is, the arranged window objects 228(0) and 228(1) are arranged in a way that window objects 228'(0) and 228'(1) are in the automatically arranged state (as shown at the right side).

Figure 6C:
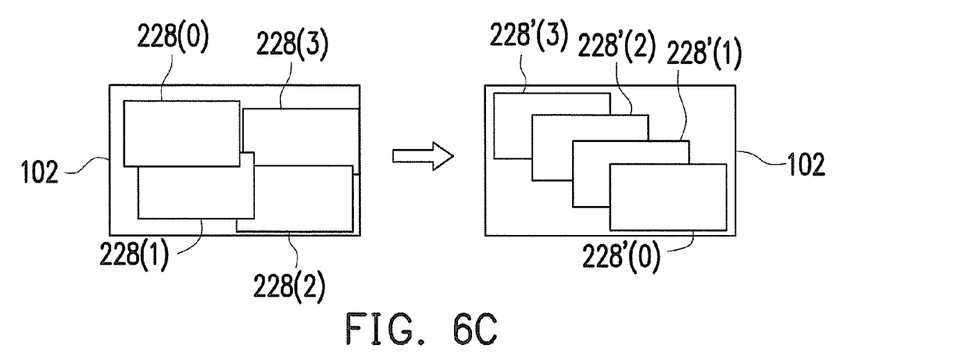
Figure 6D:
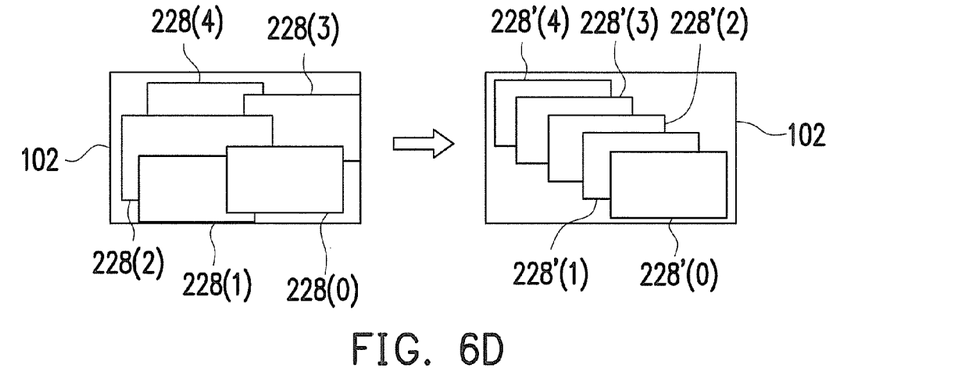

FIG. 6C illustrate a scenario where the number of the window objects currently operated on the mobile apparatus 100 and obtained by the multi-window mode controller module 222 is 4, and FIG. 6D illustrates a scenario of 5. The automatic arrangement methods illustrated in FIGS. 6C and 6D are similar to the automatic arrangement method for two window objects illustrated in 6B and will not repeated hereinafter.

Figure 7A:
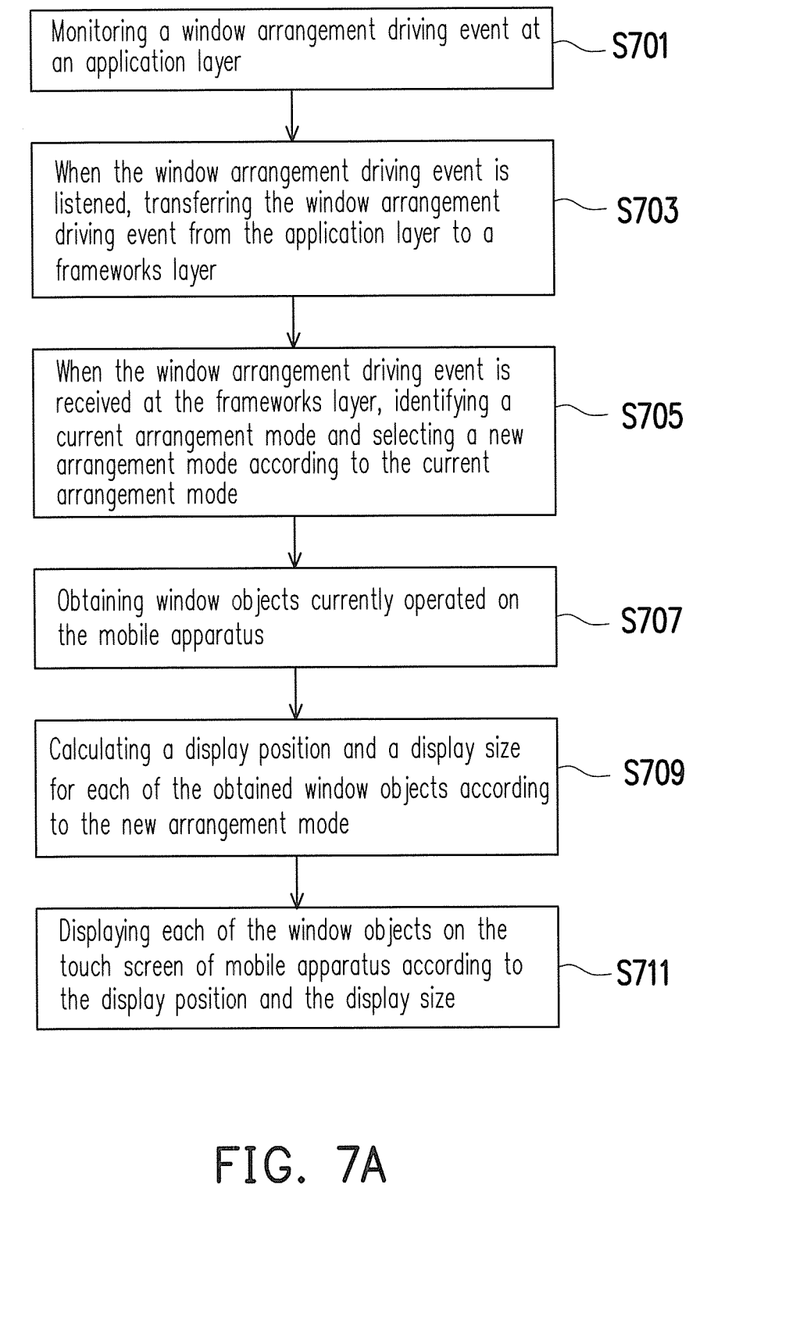
FIGS. 7A and 7B are flowcharts illustrating a method for quickly arranging multiple windows according to an exemplary embodiment of the invention.
Figure 7B:
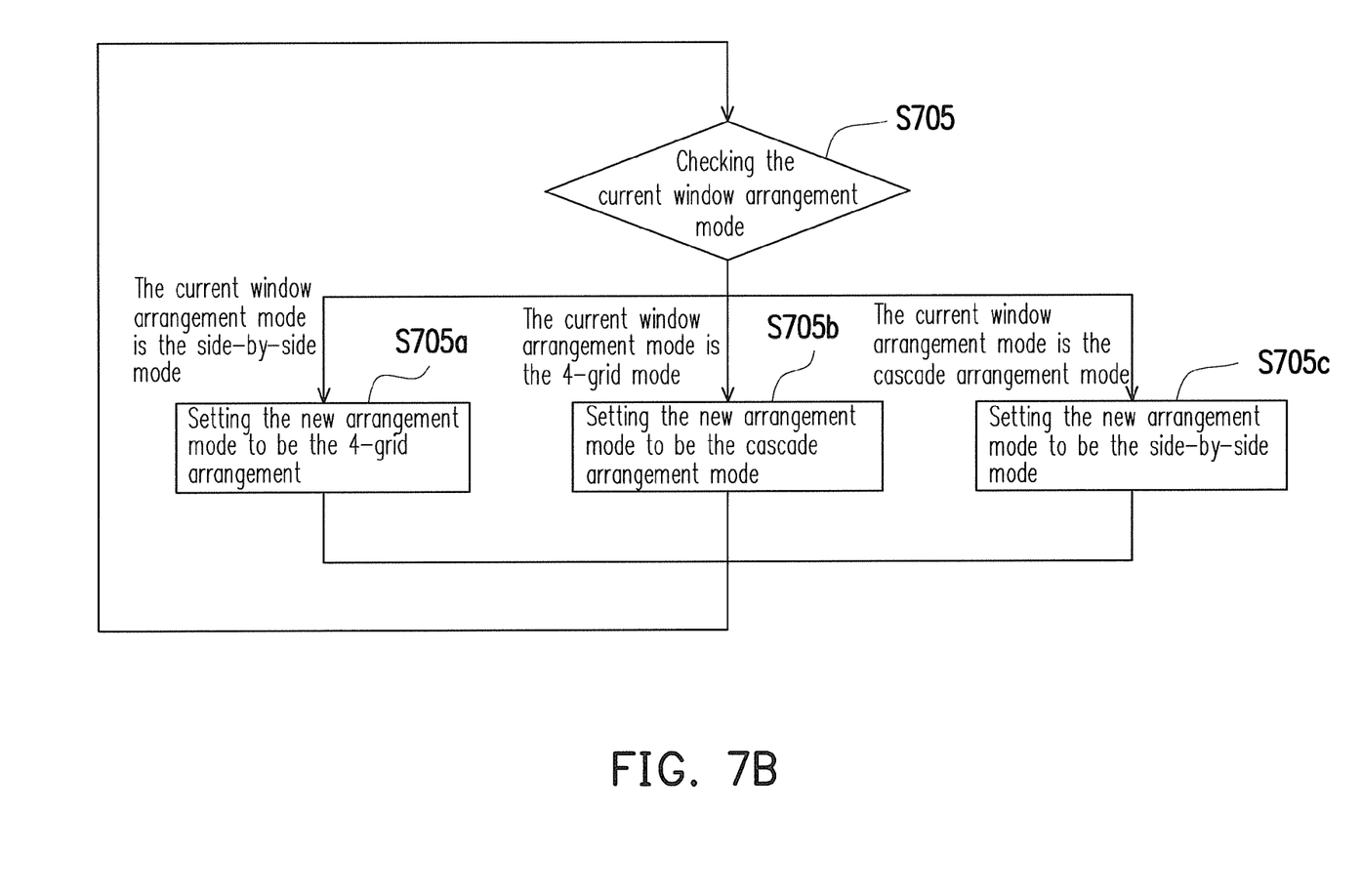

FIGS. 7A and 7B are flowcharts illustrating a method for quickly arranging multiple windows according to an exemplary embodiment of the invention.

Referring to FIG. 7A, in step S701, the rearrangement event monitoring module 210 monitor a window arrangement driving event at the application layer, where the window arrangement driving event is triggered by a key displayed on the touch screen.

In step S703, when the window arrangement driving event is generated, the rearrangement event monitoring module 210 transfers the window arrangement driving event from the application layer to the frameworks layer.

Then, in step S705, when the window arrangement driving event is received at the frameworks layer, the multi-window mode controller module 222 identifies a current arrangement mode and selects a new arrangement mode according to the current arrangement mode.

Referring to FIG. 7B, FIG. 7B illustrates a method for selecting the new arrangement mode in step S705 of FIG. 7A. In step S705, the multi-window mode controller module 222 checks the current window arrangement mode. If the current window arrangement mode is the side-by-side mode, the multi-window controller module 222 sets the new arrangement mode to be the 4-grid mode (Step S705*a*). If the current window arrangement mode is the 4-grid mode, the multi-window controller module 222 sets the new arrangement mode to be the cascade mode (step S705*b*). If the current window arrangement mode is the cascade mode, the multi-window controller module 222 sets the new arrangement mode to be the side-by-side mode (step S705*c*).

Referring to FIG. 7A again, in step S707, the multi-window mode controller module 222 obtains all the window objects currently operated on the mobile apparatus. Then, in step S709, the multi-window mode controller module 222 calculates a display position and a display size for each of the obtained window objects according to the new arrangement mode.

Thereafter, in step S711, the window setting module 226 arranges each of the window objects according to the display position and the display size thereof.

In light of the foregoing, the method and the system for quickly arranging multiple windows and the mobile apparatus thereof can provide users with an intuitive operation method. Therein, the arrangement modes can be switched for arranging the window objects operated on the mobile apparatus by a one-finger touch, and in this way, the windows can be quickly, sequentially and neatly arranged to an optimal state, such that a target window can be quickly identified in the multi-window operation system or applications provided by two or more windows can be simultaneously operated. Therefore, efficiency and smoothness of multi-operation on the mobile apparatus can be enhanced.

What is claimed is:

1. A method for quickly arranging multiple windows for a mobile apparatus having a touch screen, the method comprising:
    monitoring a window arrangement driving event at an application layer;
    when the window arrangement driving event is generated, transferring the window arrangement driving event from the application layer to a frameworks layer;
    when the window arrangement driving event is received at the frameworks layer, identifying a current arrangement mode and selecting a new arrangement mode according to the current arrangement mode;
    obtaining window objects currently operated on the mobile apparatus;
    calculating a display position and a display size for each of the obtained window objects according to the new arrangement mode; and
    displaying each of the window objects on the touch screen of mobile apparatus according to the display position and the display size,
    wherein the step of displaying each of the window objects on the touch screen of mobile apparatus according to the display position and the display size comprises:
    sequentially displaying the window objects on a foreground of the touch screen according to a sequence and setting one of the window objects as an active window.

2. The method according claim 1, wherein the sequence is determined according to an execution sequence of each of the window objects, and the one of the window objects is the latest operated window object among the window objects.

3. The method according to claim 1, further comprising:
    triggering the window arrangement event by a key displayed on the touch screen.

4. The method of claim 1, wherein the window arrangement modes comprise a side-by-side mode, a 4-grid mode and a cascade mode, and the step of identifying the current arrangement mode and selecting the new arrangement mode according to the current arrangement mode when the window arrangement driving event is received at the frameworks layer comprises:
  checking the current window arrangement mode;
  if the current window arrangement mode is the side-by-side mode, setting the new arrangement mode to be the 4-grid arrangement;
  if the current window arrangement mode is the 4-grid mode, setting the new arrangement mode to be the cascade arrangement mode; and
  if the current window arrangement mode is the cascade arrangement mode, setting the new arrangement mode to be the side-by-side mode.

5. A system for quickly arranging multiple windows for a mobile apparatus having a touch screen, the system comprising:
  a rearrangement event monitoring module configured to monitor a window arrangement driving event at an application layer;
  a window management module coupled to the rearrangement event monitoring module and configured to manage a plurality of window objects operated by the mobile apparatus; and
  an activity management module configured to sequentially display the window objects on a foreground of the touch screen according to a sequence and set one of the window objects as an active window;
  wherein when the window arrangement driving event is generated, the rearrangement event monitoring module is further configured to transfer the window arrangement driving event from the application layer to a frameworks layer,
  wherein the window management module further comprises a multi-window mode controller module configured to identify a current arrangement mode and select a new arrangement mode according to the current arrangement mode when the window arrangement driving event is received at the frameworks layer,
  wherein the multi-window mode controller module is further configured to obtain the window objects currently operated on the mobile apparatus,
  wherein the multi-window mode controller module is further configured to calculate a display position and a display size for each of the window objects according to the new arrangement mode, and
  wherein the window management module further has a window setting module configured to display each of the window objects on the touch screen of the mobile apparatus according to the display position and the display size.

6. The system according claim 5, wherein the sequence is determined according to an execution sequence of each of the window objects, and the one of the window objects is the latest operated window object among the window objects.

7. The system according claim 5, wherein the window arrangement driving event is triggered by a key displayed on the touch screen.

8. The system of claim 5, wherein the window arrangement modes comprise a side-by-side mode, a 4-grid mode and a cascade mode,
  wherein the multi-window mode controller module is further configured to check the current window arrangement mode,
  wherein if the current window arrangement mode is the side-by-side mode, the multi-window mode controller module sets the new arrangement mode to be the 4-grid mode,
  wherein if the current window arrangement mode is the 4-grid arrangement mode, the multi-window mode controller module sets the new arrangement mode to be the cascade mode, and
  wherein if the current window arrangement mode is the cascade mode, the multi-window mode controller module sets the new arrangement mode to be the side-by-side mode.

9. A mobile apparatus, comprising:
  a touch screen;
  a memory circuit configured to store a plurality of commands;
  a microprocessor coupled to the touch screen and the memory circuit to execute the commands; and
  a quick multi-window arrangement system coupled to the microprocessor and configured to quickly arrange a plurality of window objects of the mobile apparatus, the quick multi-window arrangement system comprising:
    a rearrangement event monitoring module configured to monitor a window arrangement driving event at an application layer;
    a window management module coupled to the rearrangement event monitoring module and configured to manage the window objects operated by the mobile apparatus, wherein the window management module further comprises a multi-window mode controller module; and
    an activity management module coupled to the window management module,
    wherein when the window arrangement driving event is generated, the rearrangement event monitoring module is further configured to transfer the window arrangement driving event from the application layer to a frameworks layer,
    wherein after the window arrangement driving event is received at the frameworks layer, the multi-window listening module identifies a current arrangement mode and selects a new arrangement mode according to the current arrangement mode,
    wherein the multi-window mode controller module is further configured to obtain the window objects currently operated on the mobile apparatus,
    wherein the multi-window mode controller module is further configured to calculate a display position and a display size for each of the window objects according to the new arrangement mode, and
    wherein the window management module further has a window setting module configured to display each of the window objects on the touch screen of the mobile apparatus according to the display position and the display size,
    wherein the activity management module has a foreground task setting module configured to sequentially display the window objects on a foreground of the touch screen according to a sequence and set one of the window objects as an active window.

10. The mobile apparatus according claim 9, wherein the sequence is determined according to an execution sequence of each of the window objects, and the one of the window objects is the latest operated window object among the window objects.

11. The mobile apparatus according claim 9, wherein the window arrangement driving event is triggered by a key displayed on the touch screen.

12. The mobile apparatus of claim 9, wherein the window arrangement modes comprise a side-by-side mode, a 4-grid mode and a cascade mode,
   wherein the multi-window mode controller module is further configured to check the current window arrangement mode,
   wherein if the current window arrangement mode is the side-by-side mode, the multi-window mode controller module sets the new arrangement mode to be the 4-grid mode,
   wherein if the current window arrangement mode is the 4-grid arrangement mode, the multi-window mode controller module sets the new arrangement mode to be the cascade mode, and
   wherein if the current window arrangement mode is the cascade mode, the multi-window mode controller module sets the new arrangement mode to be the side-by-side mode.

\* \* \* \* \*